United States Patent
Chung et al.

(10) Patent No.: US 8,271,210 B2
(45) Date of Patent: Sep. 18, 2012

(54) METHOD AND APPARATUS FOR ENHANCING IN-SITU GAS FLOW MEASUREMENT PERFORMANCE

(75) Inventors: Sherk Chung, Piedmont, CA (US); James MacAllen Chalmers, Danville, CA (US); Jialing Chen, San Jose, CA (US); Yi Wang, Foster City, CA (US); Paul Tran, Sacramento, CA (US); Sophia Leonidovna Shtilman, Sunnyvale, CA (US); Joseph R. Monkowski, Danville, CA (US)

(73) Assignee: Pivotal Systems Corporation, Pleasanton, CA (US)

( * ) Notice: Subject to any disclaimer, the term of this patent is extended or adjusted under 35 U.S.C. 154(b) by 394 days.

(21) Appl. No.: 12/634,568

(22) Filed: Dec. 9, 2009

(65) Prior Publication Data

US 2011/0137581 A1     Jun. 9, 2011

(51) Int. Cl.
*G06F 1/34* (2006.01)
(52) U.S. Cl. ............... 702/47; 73/1.05; 137/2; 702/50; 702/64
(58) Field of Classification Search .............. 702/45, 702/47, 50, 64, 65, 100, 114; 73/1.05, 1.16, 73/1.26, 1.35, 23.2, 861, 861.42; 137/2, 137/334, 468, 486, 624.12; 429/427
See application file for complete search history.

(56) References Cited

U.S. PATENT DOCUMENTS

| | | | |
|---|---|---|---|
| 4,114,419 A * | 9/1978 | Kimbell ..................... | 73/1.05 |
| 4,285,245 A | 8/1981 | Kennedy | |
| 5,062,446 A | 11/1991 | Anderson | |
| 5,684,245 A | 11/1997 | Hinkle | |
| 5,868,159 A | 2/1999 | Loan et al. | |
| 5,925,829 A | 7/1999 | Laragione et al. | |
| 6,216,726 B1 | 4/2001 | Brown et al. | |
| 6,363,958 B1 | 4/2002 | Ollivier | |
| 6,450,200 B1 | 9/2002 | Ollivier | |
| 6,948,508 B2 | 9/2005 | Shajii et al. | |
| 7,089,134 B2 * | 8/2006 | Barros et al. ................. | 702/114 |
| 7,136,767 B2 | 11/2006 | Shajii et al. | |
| 7,204,158 B2 | 4/2007 | Morgan et al. | |
| 7,823,436 B2 | 11/2010 | Monkowski et al. | |
| 7,875,398 B2 * | 1/2011 | Kokubo ..................... | 429/427 |
| 2009/0183549 A1 | 7/2009 | Monkowski et al. | |
| 2009/0266139 A1 | 10/2009 | Gregor et al. | |

OTHER PUBLICATIONS

International Search Report in International Application No. PCT/US2009/31170, mailed Mar. 23, 2009.

* cited by examiner

*Primary Examiner* — John H Le
(74) *Attorney, Agent, or Firm* — Nixon Peabody LLP; Joseph Bach, Esq.

(57) ABSTRACT

An in-situ gas flow measurement controller measures the temperature and rate of pressure drop upstream from a flow control device (FCD). The controller samples the pressure and temperature data and applies the equivalent of a decimating filter to the data to produce filtered data at a slower sampling rate. The controller derives timestamps by counting ticks from the sampling clock of the A/D converter that is sampling the pressure at regular intervals to ensure the timestamps associated with the pressure samples are accurate and do not contain jitter that is associated with software clocks. The controller additionally normalizes the temperature reading to account for power supply fluctuations, filters out noise from the pressure and temperature readings, and excludes data during periods of instability. It calculates the gas flow rate accounting for possible non-linearities in the pressure measurements, and provides the computed gas flow measurement via one of many possible interfaces.

22 Claims, 4 Drawing Sheets

Simplified block diagram of a gas flow monitor system

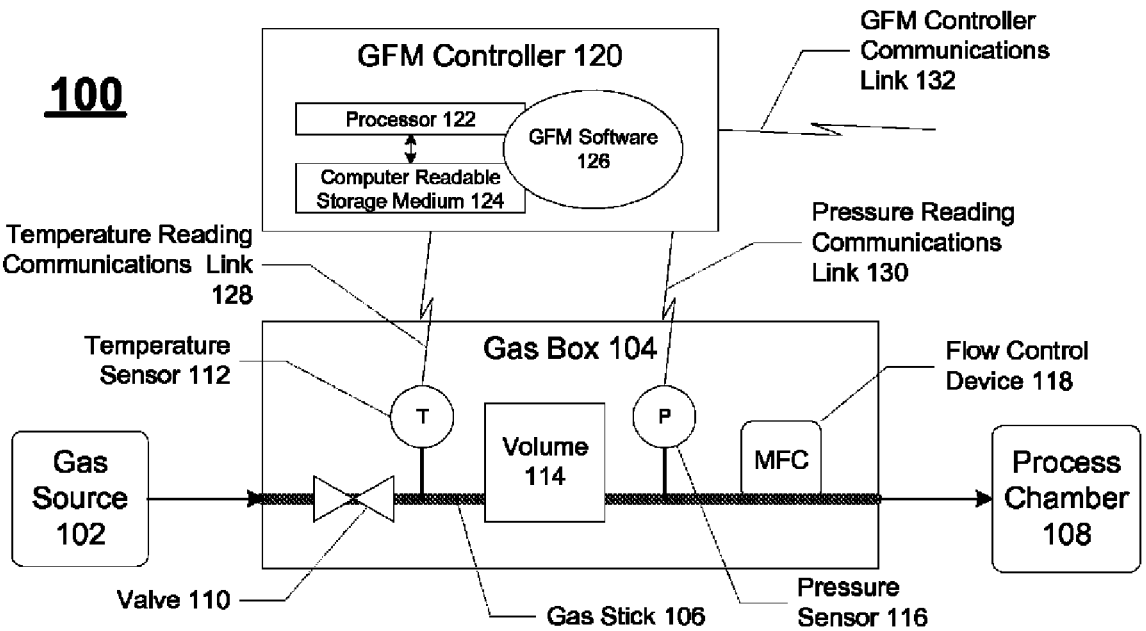
Figure 1: Simplified block diagram of a gas flow monitor system
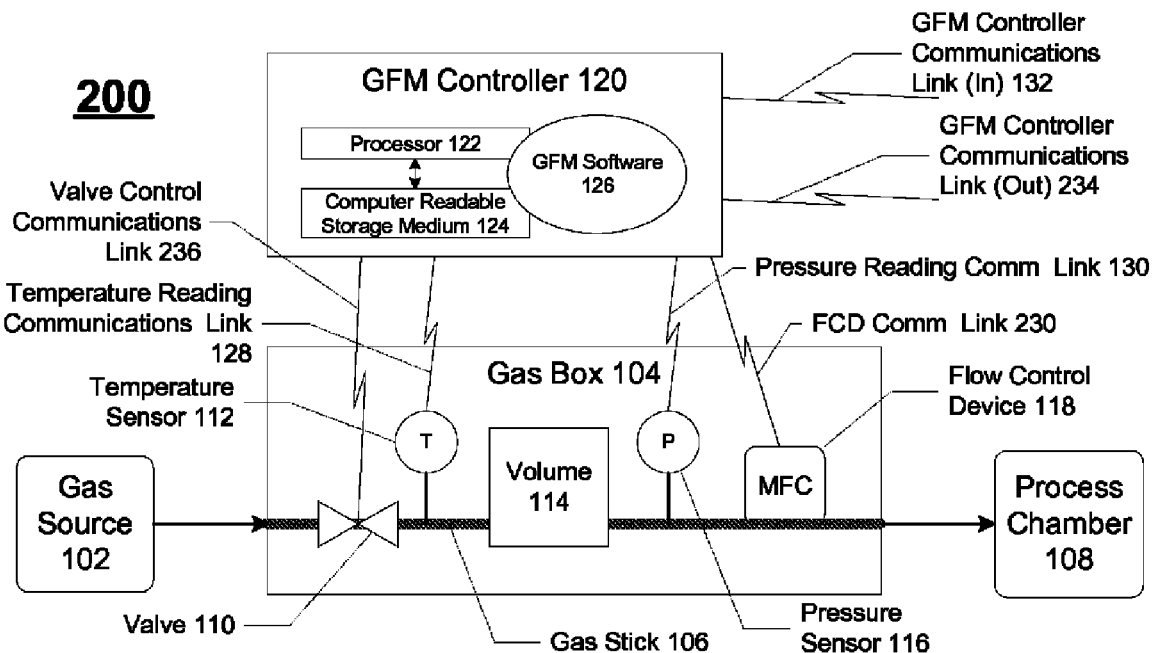
Figure 2: Block diagram of an alternate embodiment of a gas flow monitor system

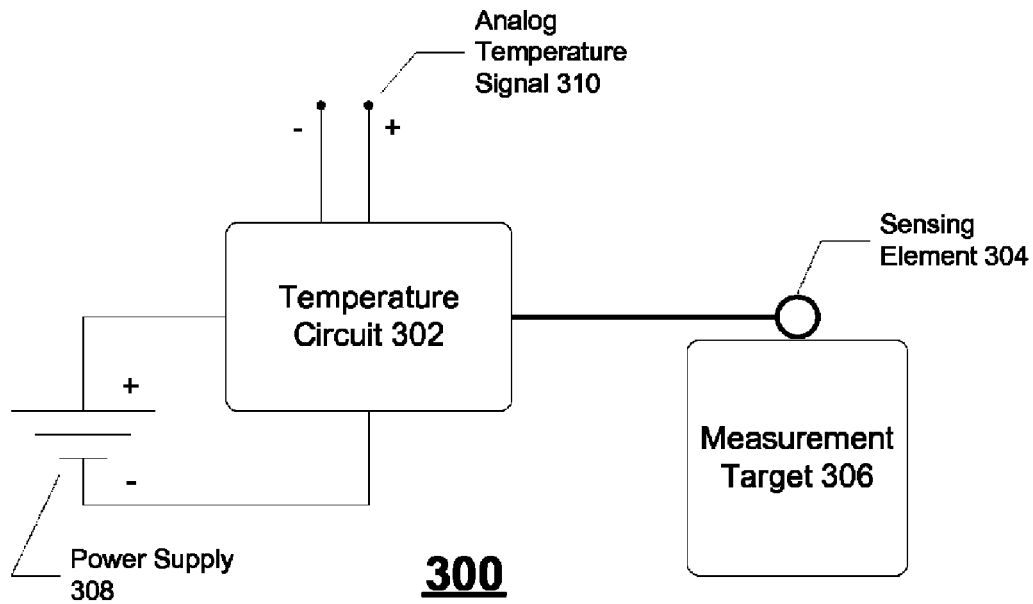
Figure 3: Simplified block diagram of a sample temperature sensor
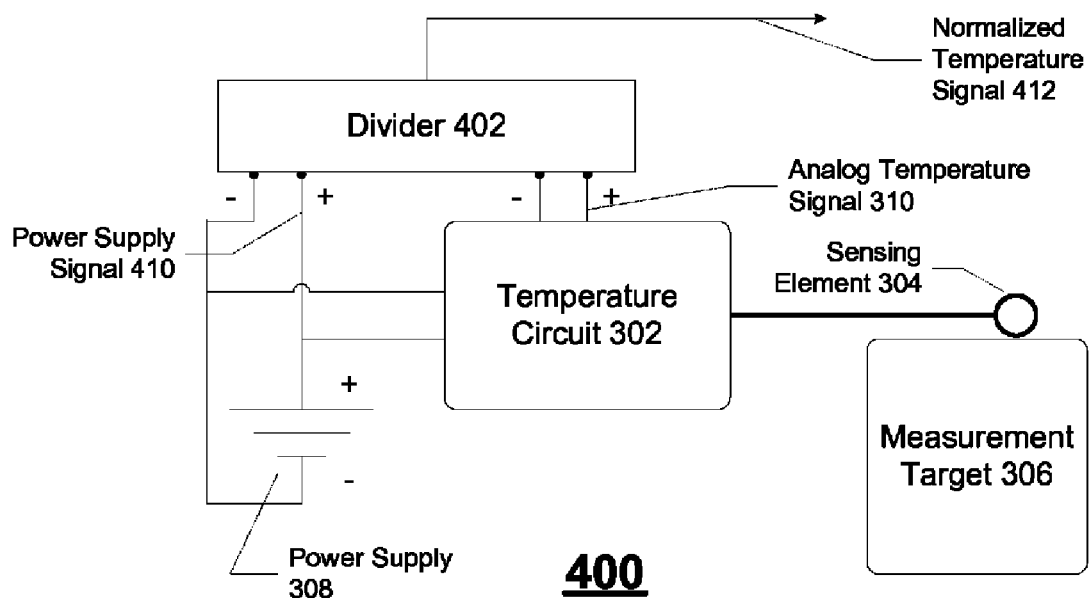
Figure 4: Simplified block diagram of a sample temperature sensor with analog normalization

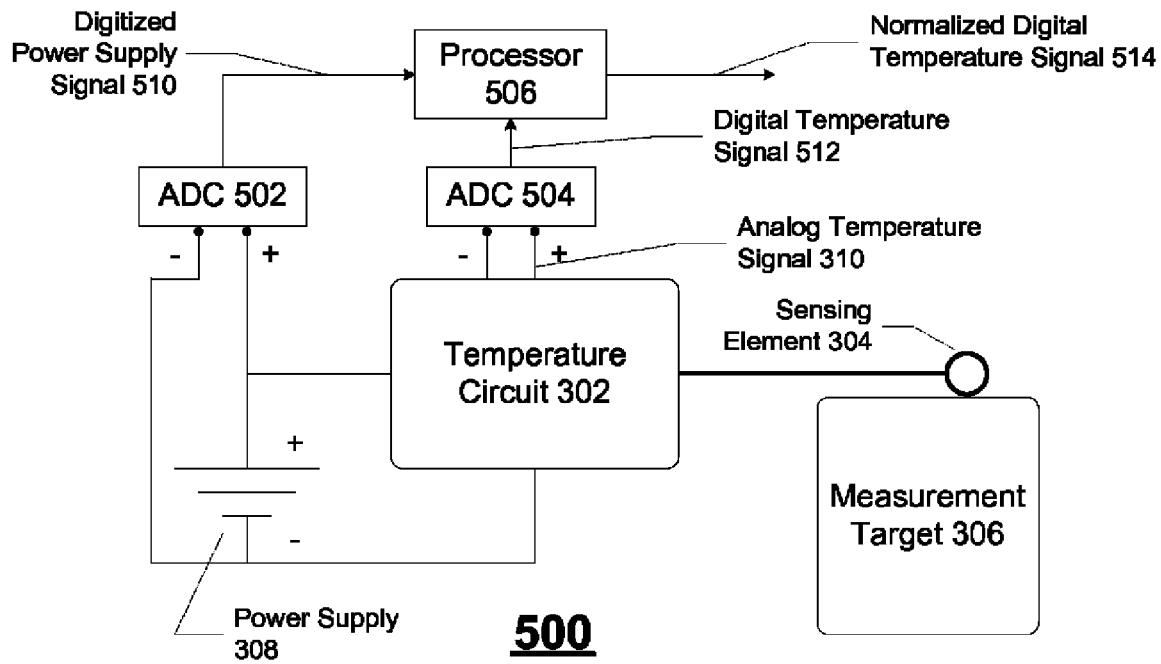
Figure 5: Simplified block diagram of a sample temperature sensor with digital normalization
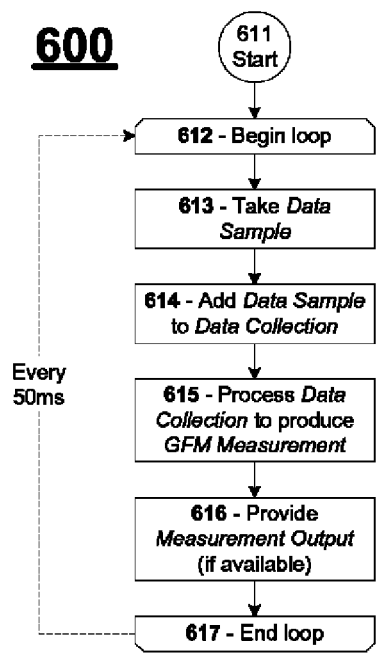
Figure 6: Example high level process flow for GFM calculation

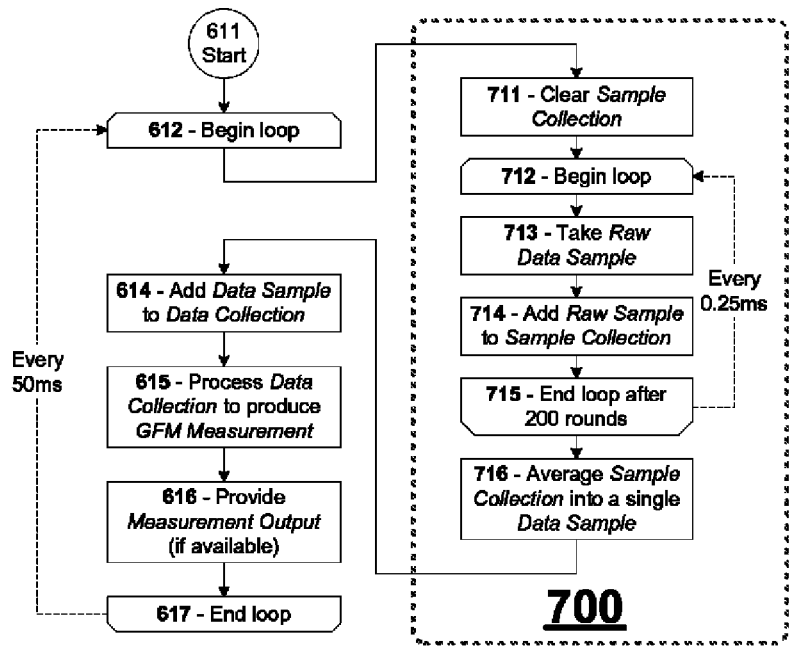
Figure 7: Example modified high level process flow for GFM calculation where sampling rate is faster than GFM processing rate
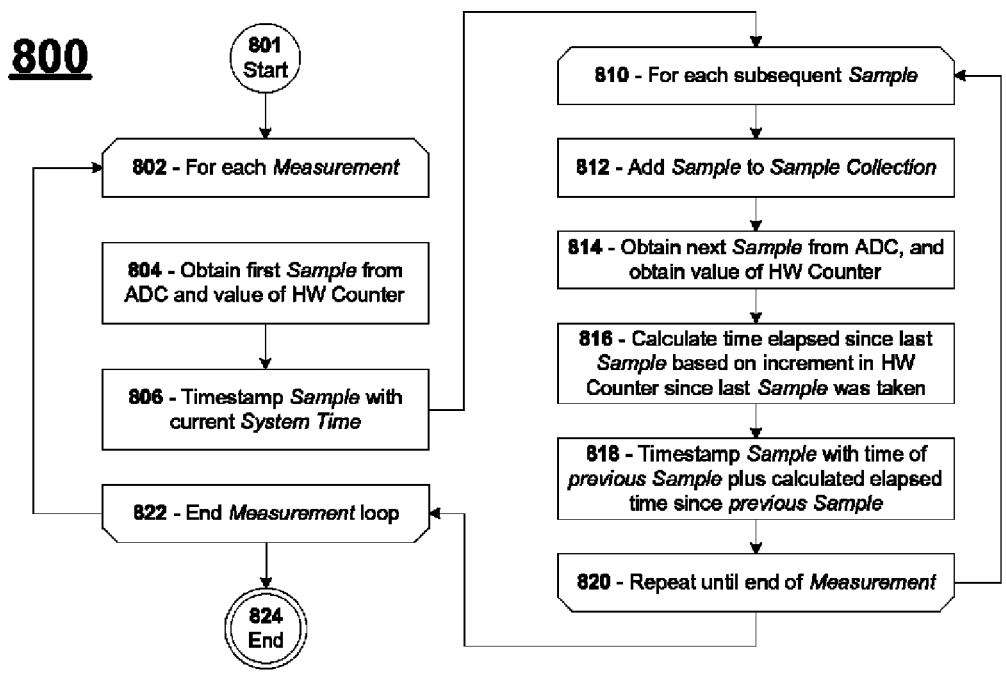
Figure 8: High level process flow for deriving accurate timestamps for GFM data samples

METHOD AND APPARATUS FOR ENHANCING IN-SITU GAS FLOW MEASUREMENT PERFORMANCE

BACKGROUND

1. Field of the Invention

The subject invention relates to gas flow measurement.

2. Related Art

The accurate flow of gas is important in many industrial processes. In the semiconductor industry, transistor critical dimensions are ever shrinking to smaller and smaller technology nodes. As the critical dimension requirements become tighter, it is becoming increasingly important to improve the precision of the wafer processing to enable the fabrication of semiconductor chips at smaller nodes. For recipes that are dependent on an accurate flow of gases, the ability to measure the accurate flow rate of individual gases into the process chamber is extremely important.

Several solutions that allow for the measurement of gas flow into a process chamber have been developed as a response to the market need. However, most of the solutions do not allow for the accurate measurement of gas flows during chamber processing. Patent application Ser. Nos. 12/354,723 and 12/355,654 by Monkowski et al, describe a novel solution that allows for in-situ gas flow measurement of individual gases flowing into a process chamber. The solution describes the method of stopping the flow of gas upstream of a gas stick's flow control device (generally a mass flow controller) and measuring the rate of pressure drop in the volume between the location where flow has been stopped and the flow control device in order to calculate a flow rate.

The precision of prior art in-situ gas flow measurement is highly dependent upon the pressure reading from a pressure measurement device. Thus, prior art systems may provide accurate measurements in well-controlled environments. However, in less controlled environments, noise or other anomalies in the pressure measurement can adversely affect the gas flow calculation, decreasing its reliability and repeatability. Similarly, noise or an offset in the temperature reading can also affect the accuracy and repeatability of the gas flow calculation.

When taking pressure measurements, the accuracy of the timestamps associated with the samples can affect the gas flow measurement, since when calculating rate of pressure drop the accuracy of the sample timestamps are as important as the accuracy of the pressure readings. The issue is further complicated since it is commonly known that typical tool and chamber controller operating system software clocks have margins of error on the order of a few milliseconds, which could affect the gas flow measurement calculation significantly.

Additionally, non-linearities and discontinuities in the gas pressure readings due to set point changes or non-ideal gas compressibility factors may cause inaccuracies in gas flow measurements. Novel methods as described in the detailed description below can be employed to account for such non-linearities and discontinuities in order to provide more accurate gas flow measurement results.

From the above, it is seen that techniques for enhancing the robustness and performance of in-situ gas flow measurement systems are desired.

SUMMARY

The following summary is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Embodiments of the present invention employ an in-situ gas flow measurement (GFM) controller that measures the temperature and rate of pressure drop upstream from a flow control device (FCD). The GFM controller samples the pressure and temperature data and applies the equivalent of a decimating filter to the data to produce filtered data at a slower sampling rate. The GFM controller derives timestamps for the pressure samples by counting ticks from the sampling clock of the analog-to-digital converter that is sampling the pressure at regular intervals to ensure the timestamps associated with the pressure samples are accurate and do not contain jitter that is associated with software clocks. The GFM controller additionally normalizes the temperature reading to account for power supply fluctuations, filters out noise from the pressure and temperature readings, and excludes data during periods of instability. It then calculates the gas flow rate accounting for possible non-linearities in the pressure measurements, and provides the computed gas flow measurement via one of many possible interfaces.

According to aspects of the invention, a method of computing the rate at which gas flows out of a processing chamber gas stick is provided, the method comprising: stopping the flow of gas into the gas stick at a first location which is upstream of a second location where gas is flowing out of the gas stick, obtaining a plurality of measurements, at a first sampling rate, of the gas in a volume in fluid communication with, and located in between, said first and second gas stick locations, obtaining a voltage reading of a power supply of a sensor providing said measurements, normalizing said measurements with said voltage reading, performing a gas flow calculation, where the gas flow calculation includes using at least two normalized measurements to compute the rate of gas flow out of said volume by calculating the rate of decrease in moles of the gas in the volume using a derivative of the ideal gas law, and providing the results of the gas flow calculation via a system interface.

According to further aspects of the invention, a method of computing the rate at which gas flows out of a processing chamber gas stick is provided, the method comprising: stopping the flow of gas into the gas stick at a first location which is upstream of a second location where gas is flowing out of the gas stick, obtaining a plurality of measurements, at a first sampling rate, of the gas in a volume in fluid communication with, and located in between, said first and second gas stick locations, filtering the measurements to produce filtered data at a second sampling rate, performing a gas flow calculation, where the gas flow calculation includes using at least two filtered data points to compute the rate of gas flow out of said volume by calculating the rate of decrease in moles of the gas in the volume using a derivative of the ideal gas law, and providing the results of the gas flow calculation via a system interface.

According to yet further aspects of the invention, a method of computing the rate at which gas flows out of a processing chamber gas stick is provided, the method comprising: stopping the flow of gas into the gas stick at a first location which is upstream of a second location where gas is flowing out of the gas stick, obtaining a plurality of measurements of the gas in a volume in fluid communication with, and located in between, said first and second gas stick locations, applying one or more criteria to determine if any measurements should be excluded from gas flow calculation, excluding any measurements from gas flow calculation that meet said criteria, performing a gas flow calculation, where the gas flow calculation includes using at least two non-excluded measurements to compute the rate of gas flow out of said volume by calculating the rate of decrease in moles of the gas in the volume using a derivative of the ideal gas law, and providing the results of the gas flow calculation via a system interface.

According to yet further aspects of the invention, a method of computing the rate at which gas flows out of a processing chamber gas stick is provided, the method comprising: stopping the flow of gas into the gas stick at a first location which is upstream of a second location where gas is flowing out of the gas stick, obtaining a plurality of measurements, at a first sampling rate, of the gas in a volume in fluid communication with, and located in between, said first and second gas stick locations, deriving time-stamps for said measurements, performing a gas flow calculation, where the gas flow calculation includes using at least two measurements and their corresponding derived time-stamps to compute the rate of gas flow out of said volume by calculating the rate of decrease in moles of the gas in the volume using a derivative of the ideal gas law, and providing the results of the gas flow calculation via a system interface.

According to yet further aspects of the invention, a method of computing the rate at which gas flows out of a processing chamber gas stick is provided, the method comprising: stopping the flow of gas into the gas stick at a first location which is upstream of a second location where gas is flowing out of the gas stick, obtaining a plurality of measurements of the gas in a volume in fluid communication with, and located in between, said first and second gas stick locations, obtaining compressibility factors of the gas that correspond to the values of said measurements, scaling said measurements by their corresponding compressibility factors, performing a gas flow calculation, where the gas flow calculation includes using at least two scaled measurements to compute the rate of gas flow out of said volume by calculating the rate of decrease in moles of the gas in the volume using a derivative of the ideal gas law, and providing the results of the gas flow calculation via a system interface.

According to yet further aspects of the invention, a gas flow measurement system is provided, which is coupled to a gas stick in fluid communication with a processing chamber, the gas stick comprising a flow control device on the gas stick located upstream of the processing chamber, a valve, on the gas stick, located upstream of the flow control device, which has the ability to regulate the flow of gas through the gas stick, and a volume in fluid communication with, and located in between, the valve and the flow control device, the system comprising: one or more sensors in fluid communication with, and located in between, the valve and the flow control device, and, a computer, in electronic communication with said sensors, and which comprises: a processor, a computer-readable medium having stored thereupon a program that, when executed on said processor causes the processor to perform any of the methods of the invention. For example, according to one implementation, the program causes the processor to perform steps: stop the flow of gas into the gas stick by turning off the valve, obtain a plurality of measurements, at a first sampling rate, of the gas in the volume, obtain a voltage reading of a power supply of the one or more sensors providing said measurements, normalize said measurements with said voltage reading, perform a gas flow calculation, where the gas flow calculation includes using at least two normalized measurements to compute the rate of gas flow out of said volume by calculating the rate of decrease in moles of the gas in the volume using a derivative of the ideal gas law, and provide the results of the gas flow calculation via a system interface.

BRIEF DESCRIPTION OF THE DRAWINGS

FIG. 1 is a simplified block diagram of a gas flow monitor system for implementing embodiments of the invention.

FIG. 2 is a block diagram of an alternate embodiment of a gas flow monitor system.

FIG. 3 is a simplified block diagram of a sample temperature sensor for implementing embodiments of the invention.

FIG. 4 is a simplified block diagram of a sample temperature sensor with analog normalization according to an embodiment of the invention.

FIG. 5 is a simplified block diagram of a sample temperature sensor with digital normalization according to an embodiment of the invention.

FIG. 6 is an example of high level process flow for GFM calculation according to an embodiment of the invention.

FIG. 7 is an example of modified high level process flow for GFM calculation where sampling rate is faster than GFM processing rate, according to an embodiment of the invention.

FIG. 8 is a high level process flow for deriving accurate timestamps for GFM data samples according to an embodiment of the invention.

DETAILED DESCRIPTION

Embodiments of the present invention employ a gas flow measurement (GFM) controller that measures the rate of gas flow through a gas stick into a processing chamber. FIG. 1 shows a GFM controller in a system 100 in accordance with the present invention. The system comprises a gas box 104 that contains a gas stick 106 which regulates the gas flow from the gas source 102 into the process chamber 108. The gas stick 106 contains a valve 110 which can regulate the flow of gas into the gas stick, a temperature sensor 112 that can measure the approximate temperature of the gas, a volume 114 which comprises the internal volume of the gas stick in between the valve 110 and the flow control device 118, a pressure sensor 116 which can measure the pressure of the gas within the volume 114, and a flow control device 118 (e.g., a conventional mass flow controller) which regulates the flow of gas out of the volume 114. A GFM controller 120 receives a notice via communications link 132 signaling when the gas stick is in a state where the valve 110 has been shut to prevent any gas from entering the volume 114, but the flow control device 118 is flowing gas out of the volume 114. The GFM controller 120, through execution of the GFM software 126, takes one or more temperature measurements over communications link 128, and at least two pressure readings over communication link 130 (which may be the same link), and uses them to calculate the flow rate of gas out of volume 114.

The temperature reading communications link 128 and the pressure reading communications link 130 can take the form of analog circuit connections, where the measurements are transmitted in the form of voltage levels over analog lines. Alternatively, the communication links can take the form of digital wired or wireless communication links, where measurements are transmitted using digital protocols such as a parallel digital bus, RS-232, RS-485, Ethernet, CanBus, WiFi, and Bluetooth, among others. Similarly, GFM controller communications link 132 can take the form of an analog line or a digital communications link, and provides the ability for an external entity (usually the chamber controller) to inform the GFM controller 120 when the gas stick is in a state where the gas flow measurement can be performed using the pressure rate of drop as described above. Additionally, the GFM controller communications link 132 has the ability to provide the results of the gas flow measurement back to the external entity.

FIG. 2 shows an alternate embodiment with additional communications links. In this embodiment, the GFM controller uses a communications link 236 to control the valve 110. It also uses communications link 230 to obtain a feedback reading from the FCD 118. In addition, it has a separate communications link 234 for providing gas flow measurement output to a separate external entity than the one in communication via link 132. In either embodiment, the communications links 132 and 234 can transmit information in the form of analog voltages, or via digital interfaces such as a parallel digital bus, RS-232, RS-485, Ethernet, CanBus, Profibus, and wireless protocols, among others.

Although the above embodiments are sufficient for obtaining an estimate of the gas flow rate out of volume 114, certain errors introduced in the measurement and sampling of the temperature and pressure can reduce the accuracy and repeatability of the gas flow measurement. The equation used by the GFM software 126 to calculate the gas flow rate is as follows as taught by Monkowski et al (derived from the ideal gas law):

$$n = PV/RT, \text{ where} \qquad \text{Equation(1)}$$

n=amount of gas
P=pressure
V=volume
R=ideal gas constant
T=temperature

By measuring the change in the variable n over time, we can determine the amount of gas leaving volume 114, thus computing the flow rate of gas out of volume 114. Thus, the flow rate f can be calculated with the following formula:

$$f = \frac{\Delta n}{\Delta t} = \frac{\Delta(PV/RT)}{\Delta t}, \text{ where} \qquad \text{Equation (2)}$$

$f$ = flow rate
$t$ = time

In the above equation, it can be seen that if some errors are introduced into the pressure, temperature, or time measurements, the resulting flow rate calculation is undesirably affected.

Temperature Input Data Error Correction

FIG. 3 illustrates an example temperature sensor for use in accordance with the present invention. Temperature sensor 300 employs an electrical circuit 302 and a supply of power 308 to convert readings from a temperature sensing element 304 into an analog temperature signal 310. Optionally, the temperature sensor 300 can digitize the analog temperature signal 310 using an ADC, or provide the output as an analog signal and let the GFM controller 120 digitize it using its own ADC.

One source for error in the measurement of temperature is noise in the analog temperature signal 310 which can come from a variety of sources, including but not limited to noise in the power supply 308, electro-magnetic interference from external sources, or aliasing of noise during sampling. When the analog temperature signal 310 is digitized, the differences in readings caused by the noise level at the time of the sampling may introduce artificial fluctuations in the digitized values, therefore introducing an artificial fluctuation in the gas flow calculation.

One embodiment of the present invention makes use of the observation that it is uncommon for the temperature on a gas stick to change radically over a short period of time. Therefore a low pass filter is applied to the temperature measurement signal to safely filter out artificial fluctuations without adversely affecting the temperature reading. In the case where the noise is periodic, a filter length integral to the period of the noise is used to filter out the periodic noise.

Another source for error in the temperature measurement is caused by the proportional relationship between power supply 308 voltage and analog temperature signal 310. Namely, since the temperature circuit 302 is using power supply 308 to provide an analog temperature output 310, the analog temperature output 310 will rise and fall proportionally to the rise and fall of the power supply 308 voltage. Thus, if a gas stick employs a first temperature sensor using a first power supply, and the same gas stick employs a second temperature sensor using a second power supply, unless the voltage output of the two said power supplies are identical, the temperature readings of the two temperature sensors will differ proportionally to the difference in power supply voltages. For example, if the first power supply provided a nominal voltage of 9.75V, while the second power supply provided a nominal voltage of 10.25V, the resulting temperature readings will differ by an amount proportional to 0.5V (the difference between 10.25V and 9.75V), even when both sensing elements are measuring the exact same temperature. Even if both temperature sensors were calibrated to adjust for the difference in power supply voltage, the voltage of the power supply can fluctuate over time, again resulting artificial fluctuations in the gas flow measurement.

Embodiments of the present invention provide for normalizing the temperature readings to account for changes in power supply voltage levels. FIG. 4 illustrates a high level block diagram of a system 400 that enhances a temperature circuit 300 to provide a normalized temperature reading that accounts for the variances in nominal voltage output from power supplies 308. A divider 402 performs the equivalent of arithmetically dividing the temperature signal 310 by the power supply signal 410 to create a normalized temperature signal 412.

FIG. 5 shows an alternate embodiment that allows for the normalization to take place after the data has been digitized. In this embodiment, analog-to-digital converters are used to digitize the power supply and temperature signals to produce a digitized power supply signal 510 and a digital temperature signal 512. A processor 506 then divides the digital temperature signal 512 by the power supply signal 510 to produce a normalized digital temperature signal 514.

In either embodiment, the normalization process will result in a normalized temperature signal that is of a different scale than the un-normalized temperature signal. This can be corrected by multiplying the normalized temperature signal by an appropriate constant. In some cases, these normalization techniques are also applicable to other data used by the GFM system, such as pressure data. For example, the power supply voltage of the pressure sensor 116 could be used to normalize the pressure readings using the same techniques described above.

Pressure Input Data Error Correction

The gas flow calculation is also susceptible to noise in the pressure readings. Similar to the temperature readings, noise in the power supply, electro-magnetic interference from external sources, or aliasing of noise during sampling, for example, could create inaccuracies in the pressure readings. One solution is to average pressures samples over a rolling window. However, unlike temperature, the pressure is expected to change materially over a short period of time, and it is desirable to monitor that change. Therefore averaging or applying a low-pass filter may result in filtering out some of the pressure signal instead of noise. In addition, filtering the pressure signal digitally would create a delay in the pressure reading proportional to the length of the filter, resulting from a delayed gas flow measurement. For some applications a delay in the gas flow measurement is acceptable, but for applications that require real-time data (such as when it is used in a real-time control loop), a delay in the gas flow measurement may be unacceptable.

Embodiments of the present invention allow for over-sampling pressure data at a rate faster than the desired data rate at which the GFM system processes data, applying a decimating filter to the raw data to produce filtered data at the desired data rate, and using the filtered data in the GFM calculations. In one embodiment, a filtered data sample is produced by averaging over-sampled data points obtained since the previous filtered data sample. For example, consider the situation where it is desired to provide GFM measurements using pressure data at 20 Hz (i.e., one sample every 50 ms). However, rather than sampling pressure data at 20 Hz, the pressure data is over-sampled at a faster rate of 4 KHz (i.e., once every 0.25 ms), which allows for averaging 200 pressure samples in order to produce each averaged sample, resulting in averaged pressure data at 20 Hz. The gas flow calculation is then performed on the 20 Hz filtered data, which results in the desired level of time granularity. One skilled in the art would see show other variations of decimating filters can be applied to achieve similar results. This technique gives the gas flow measurement system a method for filtering out noise, without incurring any additional delay in the gas flow measurement output.

FIG. 6 illustrates a high level process flow for calculating gas flow measurements without the method above. The system 600 begins processing 611 by entering into a loop 612 in which pressure samples are taken 613 and added to a collection 614. The collection of data points is processed 615, and if a sufficient number of points have been collected, a gas flow measurement is computed and optionally provided as output 616. FIG. 7 shows a high level process flow of the same example except with the added innovation of sampling data faster than it is being processed—200 times faster in the illustrated example. The flow of system 600 is enhanced by replacing step 613 with process 700, where 200 data samples are collected 713 at a faster rate of 0.25 ms, and then averaged 716 to create an averaged data sample that is used for gas flow measurement calculation 615. Although this technique is described for pre-processing pressure data, in some cases it is also applicable to other data that the GFM system collects. For example, temperature data can be over-sampled in order to average out noise using the techniques described above.

Accurate Time-stamping of Input Data

For the purposes of describing the invention, an "oscillator" is herein referred to as a device that produces a hardware timing signal, such as a CPU clock. A "system clock" is referred to as a module that keeps date and time, such as the system clock maintained by a computer operating system. The "system time" is the date and time kept by the system clock. A "gas flow measurement period" is a duration during which gas flow measurements are to be computed. Typically on a semiconductor tool, the gas flow measurement period either coincides with the duration of a recipe step or it takes place during the first several seconds of a recipe step.

Another source of error in the pressure measurements is not related to the value of the pressure measurement, but rather to the time-stamping of the measured value. Since the gas flow calculation requires the computation of the rate of change of pressure, an error in the time-stamp of a pressure sample can produce a proportional error in the gas flow measurement. A typical pressure sensor used on gas sticks in the semiconductor industry provides a pressure measurement as an analog output. It is then up to the GFM controller to digitize the analog pressure signal using an ADC and apply a time-stamp to the sample. Conventionally, in such situations a time-stamp is derived by looking up the current time from the system clock at the moment the sample is digitized by the ADC.

This conventional method of deriving a timestamp can often yield time-stamps that are not as accurate as desired, since the system time maintained by a computer operating system is typically only accurate to a few milliseconds. However, when the sampling rate is high, a few milliseconds of inaccuracy can become a first order source of error in the gas flow calculations. For example, if the GFM controller samples the pressure data at once every 50 ms., a 5 ms error in the time-stamp can result in a 10% error in a 2-point slope calculation.

Embodiments of the present invention allow for the use of a hardware oscillator to accurately time-stamp the samples from the pressure sensor. One embodiment makes use of the observation that for gas flow measurement computation, relative time is more important than absolute time. That is, it is acceptable for the timestamps to have a constant offset from an atomic time source (such as the NIST atomic clock), but it is not acceptable if there is relative time error between two pressure samples used for the gas flow measurement calculation. In the present embodiment, the timestamp for a first sample is taken from the system clock. Subsequent to that, a timestamp for a sample is derived by counting the number of oscillator ticks that have transpired since the previous sample was produced, computing the elapsed time based on the number of ticks counted, and adding the elapsed time to the time-stamp of the previous sample. Thus, the first timestamp will be a current date/time from the system clock, and subsequent timestamps will be relative to that first timestamp but accurately spaced according to the oscillator. In the preferred embodiment, the hardware oscillator is the ADC clock itself, which ensures that the time-stamps assigned to the pressure samples accurately reflect the relative time in between samples.

Over a long duration, the pressure sample time-stamps derived from the oscillator could drift apart from system time, making the gas flow measurement data difficult to correlate with other events in the fab. To resolve this problem, a revised method is employed where the derived timestamps are re-synchronized with system time at the beginning of each gas flow measurement period. In this scenario, the first time-stamp at the beginning of each gas flow measurement period is taken from the system clock, but all subsequent timestamps within the gas flow measurement period are derived from the hardware oscillator relative to the first system timestamp. This ensures that the timestamps during the gas flow measurement period remain accurate relative to each other without system clock jitter or discontinuity, while also ensuring that the derived timestamps are effectively re-synchronized with the system clock at the beginning of each gas flow measurement period. Although this effective resynchronization may cause a small discontinuity in the timestamps, the discontinuity happens outside of the gas flow measurement period where it will not have an impact on the gas flow measurements.

FIG. 8 shows a high level flow of the accurate time-stamping method of described above. At the beginning of a measurement, the first data sample is tagged with the current system timestamp 806. The timestamp for each subsequent sample (814) is derived by: (a) counting the number of HW ticks that transpired since the last sample was taken, (b) using the counted ticks to calculate an elapsed time since the last sample was taken, and (c) adding the calculated elapsed time to the timestamp of the previous sample (816, 818).

The methods described above for accurate time-stamping of pressure data can also be applied to accurately time-stamp other data that the GFM system collects.

Input Data Validation

In some situations, the error in a data sample may be of such a magnitude that it cannot be sufficiently corrected by using the above methods. For example, electro-magnetic interference from a nearby system (such as a high power pulse generator) may cause the pressure sensor to produce faulty data periodically, or a data sample may be corrupted during transmission to the GFM controller. Even if corrupted data samples were averaged with other valid samples, the magnitude of the error in the corrupted samples may still be large enough to materially skew the gas flow measurement results. In such situations, it is preferable to omit the corrupted data from the gas flow measurement calculation. Embodiments of the present invention allow for performing a "validation check" by applying a heuristic to input samples to determine whether they are fit to be used in the gas flow measurement calculation.

In one embodiment, an input data sample is compared against a threshold value to perform the validation check. If the data has crossed the threshold, the data is considered valid. Otherwise, it is discarded. In an alternate embodiment, the threshold is configured to change over time. In another embodiment, if the input data fails the validation check, the data is substituted with an alternate value (such as an extrapolated sample, a pre-configured constant, the previous value, among other choices) instead of being discarded. In another embodiment, the input data is compared to two thresholds. If the value of the input data is in between the two thresholds, the data is considered valid, and discarded otherwise. In another embodiment, a validation index is computed from multiple input samples using a mathematical formula. If the validation index crosses a threshold, the data is considered valid, and discarded otherwise. In another embodiment, the threshold itself is a mathematically computed value. If the input data crosses the computed threshold, the data is considered valid, and discarded otherwise. Other embodiments of the present invention employ a combination of the above embodiments to validate input data for gas flow measurement calculation.

Input Data Exclusion

In some situations, there may be periods of time when the input data is known to be unstable or erroneous, and therefore should be excluded from the gas flow measurement calculation. For example, if the rate of pressure change in volume 114 is suddenly altered, a period of gas flow measurement instability might result due to a combination of FCD 118 hysteresis and adiabatic expansion in the volume. The rate of pressure change in the volume can be altered by the FCD changing set points, or the valve 110 changing states, among other reasons. Initiating a gas flow measurement during such a period of instability (which involves causing the pressure to drop within the gas stick) can further increase the pressure instability and negatively affect the stability of the FCD, which can ultimately cause anomalies in the GFM system gas flow measurements. Including data during this time period of pressure instability into the gas flow calculation can result in inaccurate gas flow measurements. Embodiments of the present invention allow for excluding pressure readings during a time period immediately following an event that would alter the rate of pressure change in the volume. Such events include but are not limited to a change of the FCD set point, a change of the state of the valve, and the initiation of a gas flow measurement. In various embodiments, the time period is hard coded, configurable, or is be calculated based on available data such as FCD set point, pressure readings, and FCD feedback data. Once the time period has passed, the GFM system begins including pressure samples into the gas flow measurement.

Input Data Precision Enhancement

Embodiments of the present invention also allow for enhancing the effective bit precision of data in the GFM system in order to improve measurement precision. The GFM system receives temperature and pressure data, either digitally, or in analog form which is then converted to digital format using an ADC. In either case, the data arrives at the GFM controller with a pre-determined bit-precision, typically in the 10-18 bit range, although in some cases could be outside that range. Each input sample is subject to quantization error based on the bit-precision of the sample. The resulting gas flow measurement will have a quantization error that corresponds to the quantization error in the input data. In some situations, it is desirable to improve the gas flow measurement precision by reducing the quantization error in the measurement.

In one embodiment, the GFM controller samples input data at a rate faster than the GFM processing rate. Samples of the input data are then averaged to produce a pre-processed sample whose effective bit-precision is higher than the bit-precision of a single raw input sample, effectively reducing the quantization error in the pre-processed sample. The pre-processed samples are then used for the gas flow calculation, which results in a gas flow measurement of a higher bit-precision than would have been computed using un-preprocessed raw samples. Using this method, the gas flow calculation formula becomes:

$$f = \frac{\Delta((P_{avg})V/RT)}{\Delta t}, \text{ where } P_{avg} = \frac{\sum_i P_i}{i} \qquad \text{Equation (3)}$$

or, when temperature input samples are similarly enhanced, $$f = \frac{\Delta((P_{avg})V/R(T_{avg}))}{\Delta t}, \text{ where} \qquad \text{Equation (4)}$$

$$P_{avg} = \frac{\sum_i P_i}{i} \text{ and } T_{avg} = \frac{\sum_i T_i}{i}$$

To illustrate the concept, consider the extreme example where a GFM system is configured to compute gas flow measurements a rate of once every 30 ms using 1-bit pressure data that is also sampled at once every 30 ms. The resulting gas flow measurement would be based on pressure data with a precision of 1 bit (i.e., there are only two possible values). However, increasing the raw pressure data input sampling rate to a 10 ms interval (3 times faster than the gas flow measurement output rate) while keeping the GFM computation rate at 30 ms allows for 3 raw pressure samples to be averaged into a single pre-processed pressure sample before using the pre-processed data to compute a gas flow measurement. Averaging three 1-bit raw pressure data samples yields a resulting pre-processed sample with an effective bit-precision of 2 bits (i.e., with four possible values). As a result, the gas flow measurement calculation benefits from a higher effective bit-precision by sampling and pre-processing the input data at a faster rate than the interval at which measurements are computed. In an alternate embodiment, a similar bit-precision enhancement is achieved by averaging multiple GFM output measurements together to produce a single GFM output sample. That is, the GFM processing rate is increased to match the accelerated sampling rate, and the computed results are then averaged to provide output with an increased effective bit precision.

In another embodiment, the effective bit-precision of pressure samples derived from an ADC is enhanced by applying the full dynamic range of the ADC to a subset of the range of possible pressure values. For example, a pressure transducer may provide a voltage range of 0-10V, which corresponds to 0-100 psi. Conventionally, the corresponding ADC would be configured to sample voltages from 0-10V, and map the sampled values to the full 0-100 psi range. In this scenario, using a 10-bit ADC, pressure values would be quantized to the nearest 0.1 psi. When measuring a low flow situation where the pressure drops very slowly over time, a 0.1 psi quantization error on the pressure data could produce a sizeable percentage error in gas flow measurement. In the present embodiment of the invention, the quantization noise can be minimized by adjusting the voltage range of the ADC to only include the range of voltages that correspond to the pressure range that is expected in the volume 114. For example, if the range of pressure values in volume 114 is expected to stay between 30 psi and 40 psi, the ADC configuration is modified to apply its full dynamic range to 3-4V instead of the conventional 0-10V. By applying the full 10-bits across a range of 1V instead of 10V, the quantization error is reduced to 0.01 psia, ten times more precise than when this method is not employed.

Similar bit-precision enhancements for other data collected by the GFM system can be achieved using similar methods as described above. For example, the effective bit-precision of temperature readings can similarly enhanced using the techniques described above.

Measurement Output Enhancement

The methods described above for enhancing gas flow measurement accuracy are applied to input data samples. Embodiments of the present invention also allow for further enhancing GFM measurements by varying the pressure slope calculation formula for calculating flow rates. Equation (2) describes the method for computing gas flow rate. Given V and R are constants, and assuming T does not change materially in a small time frame (and therefore can be modeled as a constant for the purposes of demonstrating the formula), the equation can be simplified to:

$$f = \frac{\Delta P\left(\frac{V}{RT}\right)}{\Delta t} \quad \text{Equation (5)}$$

That is, the flow rate is calculated by computing a scaled "slope" of the pressure. In the basic form, slope is calculated across two pressure samples with the formula:

$$\text{slope} = \frac{\Delta P_i}{\Delta t_i} = \frac{(P_i - P_{i-1})}{(t_i - t_{i-1})} \quad \text{Equation (6)}$$

where $t_i$ is the timestamp associated with the pressure sample $P_i$. The slope is then scaled by (V/RT) to compute the gas flow rate. Although the above formula is generally effective in computing a flow rate, it may contain artificial errors based on quantization error or other noise in the pressure readings. To minimize the magnitude of these errors, the gas flow measurement formula can be enhanced to provide better accuracy.

In one embodiment, the slope of pressure is calculated using a linear fit across a time window that contains more than 2 pressure samples, using a least squares algorithm or similar. Enhancing Equation (6) to include a least squares linear fit over N data points, we get:

$$\text{slope} = \frac{\Delta P_i}{\Delta t_i} = \frac{N\sum_{a=0}^{N-1}(P_{i-a}t_{i-a}) - \left(\sum_{b=0}^{N-1}P_{i-b}\right)\left(\sum_{c=0}^{N-1}t_{i-c}\right)}{\left(N\sum_{d=0}^{N-1}(P_{i-d})^2\right)\left(N\sum_{e=0}^{N-1}(t_{i-e})^2\right)} \quad \text{Equation (7)}$$

By using a larger set of pressure samples to compute a linear fit, variance of the slope is effectively reduced. Employing a linear fit formula also has a side effect of causing a delay in the gas flow measurement output. To counteract that delay, in another embodiment, the number pressure samples in the window is varied over time to minimize the output delay. For example, the first output sample is computed using a window containing only two pressure samples. The next output sample is computed using a window containing three pressure samples, and so on, until a configurable input sample limit has been reached. Once the limit is reached, subsequent output samples are computing using the same number pressure samples as the previous output sample until the gas flow measurement period ends.

In another embodiment, the gas flow measurement output data is itself averaged over a window containing multiple gas flow measurement point to filter out noise in the measurement. The size of the averaging window is proportional to the delay in measurement output, which can be counteracted using a similar method as described previously of growing the window over time. If the GFM system is configured to process data faster than the desired output granularity, the output can be averaged without incurring a delay in the measurement output.

Variable Gas Compressibility

In Equation (5) above, the gas flow is modeled as a scaled pressure slope, because V/RT is modeled as a constant. However, as taught by Monkowski, the ideal gas constant R does not behave like a constant because gases used for semiconductor processing are all real (non-ideal) to some extent.

So although Equation (5) is sufficient to provide a gas flow measurement, the accuracy of the gas flow measurement can be enhanced by adjusting the equation to match the behavior of each real gas being measured. Thus Equation (1) can be expanded to:

$$n = PV/ZRT, \text{ where} \quad \text{Equation (8)}$$

n=amount of gas
P=pressure
V=volume
Z=gas compressibility factor
R=ideal gas constant
T=temperature Expanding Equation (5) to account for Z, we get:

$$f = \frac{\Delta P\left(\frac{V}{ZRT}\right)}{\Delta t} \qquad \text{Equation (9)}$$

The gas compressibility factor Z is used to account for the behavior of the real gas being delivered by the gas stick. At first glance, one could surmise that each gas stick only delivers a single gas to the process chamber, so that once Z is determined for that gas, it can be treated as a constant for gas flow calculation purposes on that gas stick. Although treating Z as a constant is sufficient for estimating the gas flow rate in some situations, a higher accuracy can be obtained by treating Z as a variable instead of a constant. It is well known in the art that Z generally increases with pressure and decreases with temperature in a non-linear fashion. Therefore, since Z varies non-linearly as a function of pressure and temperature, modeling the flow as a scaled pressure slope as indicated in Equation (9) will yield a gas flow measurement that drifts non-linearly over time (since pressure and temperature change over time during the gas flow measurement). To correct that drift, the slope calculation formula is re-written as:

$$f = \frac{\Delta\left(\frac{P}{Z_{P,T}}\right)\left(\frac{V}{RT}\right)}{\Delta t} \qquad \text{Equation (10)}$$

treating T as a constant in order to simplify the equation to illustrate the innovation related to Z. In Equation (10) above, one can see how to the compressibility factor Z is a function of pressure and temperature, and can affect the gas flow rate f. Empirically, the resulting flow calculation from Equations (5) and (9) may appear non-linear over time, whereas correcting with Z as shown in Equation (10) compensates for that inherent non-linearity. Therefore, a more accurate flow measurement can be obtained by performing a linear fit over the change in moles (which are Z-corrected) instead of doing the linear fit over the change in pressures (which are not inherently Z-corrected). Enhancing Equation (10) to provide for a linear fit over N mole data points using the least squares method yields:

$$f = \frac{N\sum_{a=0}^{N-1}(n_{i-a}t_{i-a}) - \left(\sum_{b=0}^{N-1} n_{i-b}\right)\left(\sum_{c=0}^{N-1} t_{i-c}\right)}{\left(N\sum_{d=0}^{N-1}(n_{i-d})^2\right)\left(N\sum_{e=0}^{N-1}(t_{i-e})^2\right)}, \qquad \text{Equation (11)}$$

$$\text{where } n_i = \frac{P_i V}{Z_i R T_i}$$

Embodiments of the present invention allow for dynamically adjusting the gas compressibility factor Z during the course of gas flow measurement, to account for the changes in pressure and temperature occurring during the gas flow measurement. In one embodiment, Z is obtained from a look-up table using pressure as a look-up index to determine the compressibility factor at the measured pressure and temperature. In this embodiment, the GFM software takes a pressure measurement and temperature measurement and uses them to look up a corresponding gas compressibility factor in the look-up table. If an index for the measured pressure does not exist, the closest match or an interpolation can be performed to determine the compressibility factor to be used in the gas flow calculation. The data in the lookup table can be derived either through empirical observation, or by using readily available compressibility charts where they exists for the gases being measured. In a related embodiment, the look-up table may only use pressure as a look-up index, and assume temperature to be relatively constant.

In another embodiment, the gas compressibility factor is dynamically computed at the time of gas flow measurement using a mathematical formula. The formula models the gas compressibility as a function of pressure and temperature. In this embodiment, the GFM software takes a pressure reading and temperature reading, and uses them to compute the compressibility factor for the gas using the pressure and temperature readings. In a related embodiment, the formula assumes a constant temperature so only a pressure reading is required to compute the gas compressibility factor. In another embodiment, the mathematical formula uses configurable coefficients in order to use the same formula (with different coefficients) across multiple gas sticks, reducing the need to code separate formulas in the GFM software.

While the above description has focused upon the use of the invention in connection with a gas stick for a semiconductor processing chamber, embodiments in accordance with the present invention are not limited to uses in the semiconductor industry. Other industries in which this invention may be applicable include but are not limited to the manufacture of plasma and liquid crystal displays, solar panel manufacturing, industrial diamond manufacturing, and other industries employing tools similar to those used in semiconductor manufacturing.

It is also understood that the examples and embodiments described herein are for illustrative purposes only and that various modifications or changes in light thereof will be suggested to persons skilled in the art and are to be included within the spirit and purview of this application and scope of the appended claims.

The invention claimed is:

1. A method of computing a rate at which gas flows out of a processing chamber gas stick, the method comprising:
    stopping the flow of gas into the gas stick at a first location which is upstream of a second location where gas is flowing out of the gas stick,
    obtaining a plurality of measurements of the gas in a volume in fluid communication with, and located in between, said first and second gas stick locations,
    obtaining a voltage reading of a power supply of a sensor providing said measurements,
    normalizing said measurements with said voltage reading,
    performing a gas flow calculation, where the gas flow calculation includes using at least one normalized measurement to compute the rate of gas flow out of said volume by calculating the rate of decrease in moles of the gas in the volume using a derivative of ideal gas law, and providing results of the gas flow calculation via a system interface.

2. The method in claim 1, where the normalization of the measurements is performed in hardware.

3. The method in claim 1, where the normalization of the measurements is performed in software.

4. The method in claim 1, wherein said measurements are taken from a pressure sensor.

5. The method in claim 1, wherein said measurements are taken from a temperature sensor.

6. The method in claim 5, where said temperature measurements are defaulted to a number.

7. The method in claim 1, wherein said system interface comprises a conductor carrying an analog voltage.

8. The method in claim 1, wherein said system interface comprises a digital interface.

9. The method in claim 1, wherein said system interface comprises a file stored on computer-readable medium.

10. A gas flow measurement system coupled to a gas stick in fluid communication with a processing chamber, the gas stick comprising a flow control device on the gas stick located upstream of the processing chamber, a valve, on the gas stick, located upstream of the flow control device, which has ability to regulate flow of gas through the gas stick, and a volume in fluid communication with, and located in between, the valve and the flow control device, the system comprising:
one or more sensors in fluid communication with, and located in between, the valve and the flow control device, and,
a computer, in electronic communication with said sensors, and which comprises:
a processor,
a computer-readable medium having stored thereupon a program that, when executed on said processor causes the processor to perform the steps:
stop the flow of gas into the gas stick by turning off the valve,
obtain a plurality of measurements of the gas in the volume,
obtain a voltage reading of a power supply of the one or more sensors providing said measurements,
normalize said measurements with said voltage reading,
perform a gas flow calculation, where the gas flow calculation includes using at least one normalized measurement to compute rate of gas flow out of said volume by calculating the rate of decrease in moles of the gas in the volume using a derivative of ideal gas law,
and provide results of the gas flow calculation via a system interface.

11. A method of computing rate at which gas flows out of a processing chamber gas stick, the method comprising:
stopping the flow of gas into the gas stick at a first location which is upstream of a second location where gas is flowing out of the gas stick,
obtaining a plurality of measurements, at a first sampling rate, of the gas in a volume in fluid communication with, and located in between, said first and second gas stick locations,
filtering the measurements to produce filtered data at a second sampling rate,
performing a gas flow calculation, where the gas flow calculation includes using at least two filtered data points to compute the rate of gas flow out of said volume by calculating the rate of decrease in moles of the gas in the volume using a derivative of ideal gas law,
and providing results of the gas flow calculation via a system interface.

12. The method in claim 11, where the first sampling rate is equal to the second sampling rate.

13. The method in claim 11, where the first sampling rate is faster than the second sampling rate.

14. The method in claim 13, where a decimating filter is used to filter said measurements.

15. The method in claim 13, where the filtering involves averaging two or more measurements.

16. The method in claim 11, further comprising averaging two or more gas flow calculation results.

17. The method in claim 11, wherein said measurements are taken from a pressure sensor.

18. The method in claim 11, wherein said measurements are taken from a temperature sensor.

19. The method in claim 11, wherein said system interface comprises a conductor carrying an analog voltage.

20. The method in claim 11, wherein said system interface comprises a digital interface.

21. The method in claim 11, wherein said system interface comprises a file stored on computer-readable medium.

22. A gas flow measurement system coupled to a gas stick in fluid communication with a processing chamber, the gas stick comprising a flow control device on the gas stick located upstream of the processing chamber, a valve, on the gas stick, located upstream of the flow control device, which has ability to regulate flow of gas through the gas stick, and a volume in fluid communication with, and located in between, the valve and the flow control device, the system comprising:
one or more sensors in fluid communication with, and located in between, the valve and the flow control device, and,
a computer, in electronic communication with said sensors, and which comprises:
a processor,
a computer-readable medium having stored thereupon a program that, when executed on said processor causes the processor to perform the steps:
stop the flow of gas into the gas stick by turning off the valve,
obtain a plurality of measurements, at a first sampling rate, of the gas in the volume,
filtering the measurements to produce filtered data at a second sampling rate,
performing a gas flow calculation, where the gas flow calculation includes using at least two filtered data points to compute rate of gas flow out of said volume by calculating the rate of decrease in moles of the gas in the volume using a derivative of ideal gas law,
and provide results of the gas flow calculation via a system interface.

* * * * *